United States Patent
Takei

(10) Patent No.: US 9,885,298 B2
(45) Date of Patent: Feb. 6, 2018

(54) FUEL INJECTION CONTROL DEVICE FOR ENGINE

(71) Applicant: TOYOTA JIDOSHA KABUSHIKI KAISHA, Toyota-shi (JP)

(72) Inventor: Takuya Takei, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/289,598

(22) Filed: Oct. 10, 2016

(65) Prior Publication Data
US 2017/0107930 A1    Apr. 20, 2017

(30) Foreign Application Priority Data
Oct. 15, 2015   (JP) .................. 2015-204005

(51) Int. Cl.
*F02D 19/00*   (2006.01)
*F02D 41/00*   (2006.01)
(Continued)

(52) U.S. Cl.
CPC ....... *F02D 41/0025* (2013.01); *F02D 19/084* (2013.01); *F02D 19/087* (2013.01);
(Continued)

(58) Field of Classification Search
CPC .. F02D 41/0025; F02D 35/026; F02D 19/084; F02D 19/085; F02D 19/087; F02D 19/088; F02D 2200/0611
See application file for complete search history.

(56) References Cited

U.S. PATENT DOCUMENTS 4,616,481 A * 10/1986 Melchior .............. F02B 37/166
                                                                60/606
6,003,496 A * 12/1999 Maloney ............... F02D 41/047
                                                                123/480
(Continued)

FOREIGN PATENT DOCUMENTS

JP          62-93351 A      4/1987
JP          2004-218437     8/2004
(Continued)

*Primary Examiner* — Thomas Moulis
(74) *Attorney, Agent, or Firm* — Oblon, McClelland, Maier & Neustadt, L.L.P.

(57) ABSTRACT

An electronic control unit includes a seat temperature calculating unit, a supply amount control unit, and a concentration acquiring unit. The seat temperature calculating unit calculates a simulated temperature of an exhaust valve seat. When the simulated temperature of the exhaust valve seat becomes equal to or higher than a threshold temperature, the supply amount control unit starts fuel increase control of increasing a lower limit value of an amount of fuel to be supplied into a cylinder to a larger value than that before the simulated temperature becomes equal to or higher than the threshold temperature. The concentration acquiring unit acquires an ethanol concentration of the fuel. In the fuel increase control, the supply amount control unit makes the amount of increase in the lower limit value larger as the ethanol concentration of the fuel acquired by the concentration acquiring unit is higher.

4 Claims, 4 Drawing Sheets

(51) Int. Cl.
*F02D 19/08* (2006.01)
*F02D 35/02* (2006.01)
(52) U.S. Cl.
CPC .... *F02D 35/026* (2013.01); *F02D 2200/0611* (2013.01); *Y02T 10/36* (2013.01)

(56) References Cited

U.S. PATENT DOCUMENTS

| | | |
|---|---|---|
| 9,453,465 B2 * | 9/2016 | Bidner .................. F02M 26/36 |
| 9,624,872 B2 * | 4/2017 | Bidner .................. F02M 25/00 |
| 2005/0216173 A1 * | 9/2005 | Toyoshima ........... F02D 41/047 |
| | | 701/104 |
| 2014/0331642 A1 * | 11/2014 | Dearth ................. F02D 19/025 |
| | | 60/273 |
| 2014/0331970 A1 * | 11/2014 | Bidner ............... F02D 19/0642 |
| | | 123/435 |

FOREIGN PATENT DOCUMENTS

| | | |
|---|---|---|
| JP | 2008-82329 | 4/2008 |
| JP | 2008-133726 | 6/2008 |
| JP | 2008-215303 | 9/2008 |
| JP | 2014-152640 | 8/2014 |

* cited by examiner

FUEL INJECTION CONTROL DEVICE FOR ENGINE

INCORPORATION BY REFERENCE

The disclosure of Japanese Patent Application No. 2015-204005 filed on Oct. 15, 2015 including the specification, drawings and abstract is incorporated herein by reference in its entirety.

BACKGROUND

1. Field

The disclosure relates to a fuel injection control device for an engine in which fuel containing ethanol is supplied into a cylinder.

2. Description of Related Art

Japanese Patent Application Publication No. 2008-82329 (JP 2008-82329 A) describes an example of an engine in which mixed fuel containing both ethanol and gasoline is used. Such an engine is provided with an exhaust valve seat with which a disk portion of an exhaust valve comes into contact. The abrasion resistance of the exhaust valve seat is enhanced by coating the exhaust valve seat with an oxide film.

When fuel containing ethanol is combusted in a combustion chamber, acetaldehyde is produced. In a state where the temperature in the combustion chamber is high and thus the exhaust valve seat is at a high temperature, when acetaldehyde is produced as described above, the oxide film is likely to be easily separated from the exhaust valve seat.

SUMMARY

The embodiment provides a fuel injection control device for an engine, the fuel injection control device configured to avoid reduction in the abrasion resistance of an exhaust valve seat coated with an oxide film, by reducing the separation of the oxide film from the exhaust valve seat.

A fuel injection control device for an engine according to an aspect of the embodiment is configured to be applied to an engine that operates on fuel containing ethanol, the engine being provided with an exhaust valve seat coated with an oxide film. The fuel injection control device for the engine includes a seat temperature calculating unit, a supply amount control unit, and a concentration acquiring unit. The seat temperature calculating unit calculates a simulated temperature of the exhaust valve seat such that the simulated temperature of the exhaust valve seat is higher as an engine speed is higher, and the simulated temperature of the exhaust valve seat is higher as an engine load factor is larger. When the simulated temperature of the exhaust valve seat calculated by the seat temperature calculating unit becomes equal to or higher than a threshold temperature, the supply amount control unit starts fuel increase control of increasing (raising) a lower limit value of an amount of fuel to be supplied into a cylinder to a larger value than that before the simulated temperature becomes equal to or higher than the threshold temperature. The concentration acquiring unit acquires an ethanol concentration of the fuel. In the fuel increase control, the supply amount control unit sets an amount by which the lower limit value of the fuel supply amount is increased when the simulated temperature of the exhaust valve seat becomes equal to or higher than the threshold temperature, such that the amount of increase is larger as the ethanol concentration of the fuel acquired by the concentration acquiring unit is higher. The aspect of the embodiment may also be defined as follows. The aspect of the embodiment relates to a fuel injection control device for an engine, the engine configured to operate on fuel containing ethanol, and the engine provided with an exhaust valve seat coated with an oxide film. The fuel injection control device includes an electronic control unit configured to (i) calculate a simulated temperature of the exhaust valve seat such that (a) the simulated temperature of the exhaust valve seat is higher as an engine speed is higher, and (b) the simulated temperature of the exhaust valve seat is higher as an engine load factor is larger, (ii) start fuel increase control when the simulated temperature of the exhaust valve seat becomes equal to or higher than a threshold temperature, the fuel increase control being a control of increasing (raising) a lower limit value of a fuel supply amount to a larger value than the lower limit value of the fuel supply amount when the simulated temperature of the exhaust valve seat is lower than the threshold temperature, and the fuel supply amount being an amount of fuel to be supplied into a cylinder, (iii) acquire an ethanol concentration of the fuel, and (iv) control the fuel supply amount such that an amount of increase in the lower limit value of the fuel supply amount is larger as the ethanol concentration of the fuel is higher, in the fuel increase control.

When the temperature of the exhaust valve seat is high, the oxide film may be easily separated from the exhaust valve seat due to acetaldehyde produced by combustion of the fuel in the cylinder. As the amount of acetaldehyde produced in the cylinder is larger, the oxide film is more likely to be separated from the exhaust valve seat.

As the amount of fuel supplied into the cylinder is larger, the temperature in a combustion chamber becomes lower due to latent heat of vaporization of the fuel and it is thus possible to more reliably achieve the state where the temperature of the exhaust valve seat is low, in an intake stroke. By reliably achieving the state where the temperature of the exhaust valve seat is low in this way, it is possible to prevent the oxide film from being easily separated from the exhaust valve seat even when acetaldehyde is produced in the cylinder.

In view of this, with the foregoing configuration, when the simulated temperature of the exhaust valve seat becomes equal to or higher than the threshold temperature, the fuel increase control is started. In the fuel increase control, the lower limit value of the amount of fuel to be supplied into the cylinder is increased to a larger value than that before the simulated temperature of the exhaust valve seat becomes equal to or higher than the threshold temperature. An amount of increase in the lower limit value of the amount of fuel to be supplied into the cylinder is made larger as the ethanol concentration of the fuel is higher. When the lower limit value of the amount of fuel to be supplied into the cylinder is increased to a larger value by executing the fuel increase control in this way, the amount of fuel actually supplied into the cylinder is less likely to be smaller than when the lower limit value of the supply amount of the fuel is not increased. Thus, in the intake stroke, it is possible to reliably achieve the state where the temperature in the combustion chamber in the cylinder is low, thereby reliably achieving the state where the actual temperature of the exhaust valve seat is low. As a result, the oxide film is prevented from being easily separated from the exhaust valve seat. By reducing the separation of the oxide film from the exhaust valve seat in this way, it is possible to avoid reduction in the abrasion resistance of the exhaust valve seat.

In the fuel injection control device for the engine, the supply amount control unit may end execution of the fuel increase control when the simulated temperature of the exhaust valve seat calculated by the seat temperature calculating unit becomes lower than the threshold temperature while the fuel increase control is executed. With this configuration, while the fuel increase control is executed after the simulated temperature of the exhaust valve seat becomes equal to or higher than the threshold temperature, when at least one of the engine speed and the engine load factor decreases and the simulated temperature becomes lower than the threshold temperature, execution of the fuel increase control ends. That is, the lower limit value of the amount of fuel to be supplied into the cylinder is made smaller than that before the simulated temperature becomes lower than the threshold temperature. Thus, the state where the amount of fuel actually supplied into the cylinder is large is less likely to be maintained. The amount of fuel actually supplied into the cylinder is less likely to be unnecessarily increased and accordingly it is possible to reduce deterioration of exhaust emission, as compared with the case where the fuel increase control is executed even after the simulated temperature becomes lower than the threshold temperature.

As the engine speed becomes higher, the temperature in the combustion chamber becomes higher, and thus the temperature of the exhaust valve seat is likely to be higher. As the temperature of the exhaust valve seat becomes higher, the oxide film is more easily separated from the exhaust valve seat. In view of this, in the fuel injection control device for the engine, the supply amount control unit may set an amount by which the lower limit value of the fuel supply amount is increased when the simulated temperature of the exhaust valve seat becomes equal to or higher than the threshold temperature, such that the amount of increase is larger as the engine speed is higher, in the fuel increase control.

With this configuration, as the engine speed is higher and thus the oxide film is more likely to be separated from the exhaust valve seat, the lower limit value of the supply amount of the fuel can be increased by a larger amount through execution of the fuel increase control. Thus, it is possible to reliably achieve the state where the amount of fuel actually supplied into the cylinder is larger, thereby reliably achieving the state where the temperature in the combustion chamber is lower. As a result, while the fuel increase control is executed, it is possible to reliably achieve the state where the actual temperature of the exhaust valve seat is low, thereby enhancing the effect of preventing the oxide film from being easily separated from the exhaust valve seat.

As the engine load factor becomes larger, the temperature in the combustion chamber becomes higher, and thus the temperature of the exhaust valve seat is likely to be higher. As the temperature of the exhaust valve seat becomes higher, the oxide film is more easily separated from the exhaust valve seat. In view of this, in the fuel injection control device for the engine, the supply amount control unit may set an amount by which the lower limit value of the fuel supply amount is increased when the simulated temperature of the exhaust valve seat becomes equal to or higher than the threshold temperature, such that the amount of increase is larger as the engine load factor is larger, in the fuel increase control.

With this configuration, as the engine load factor is larger and thus the oxide film is more likely to be separated from the exhaust valve seat, the lower limit value of the supply amount of the fuel can be increased by a larger amount through execution of the fuel increase control. Thus, it is possible to reliably achieve the state where the amount of fuel actually supplied into the cylinder is larger, thereby reliably achieving the state where the temperature in the combustion chamber is lower. As a result, while the fuel increase control is executed, it is possible to reliably achieve the state where the actual temperature of the exhaust valve seat is low, thereby enhancing the effect of preventing the oxide film from being easily separated from the exhaust valve seat.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
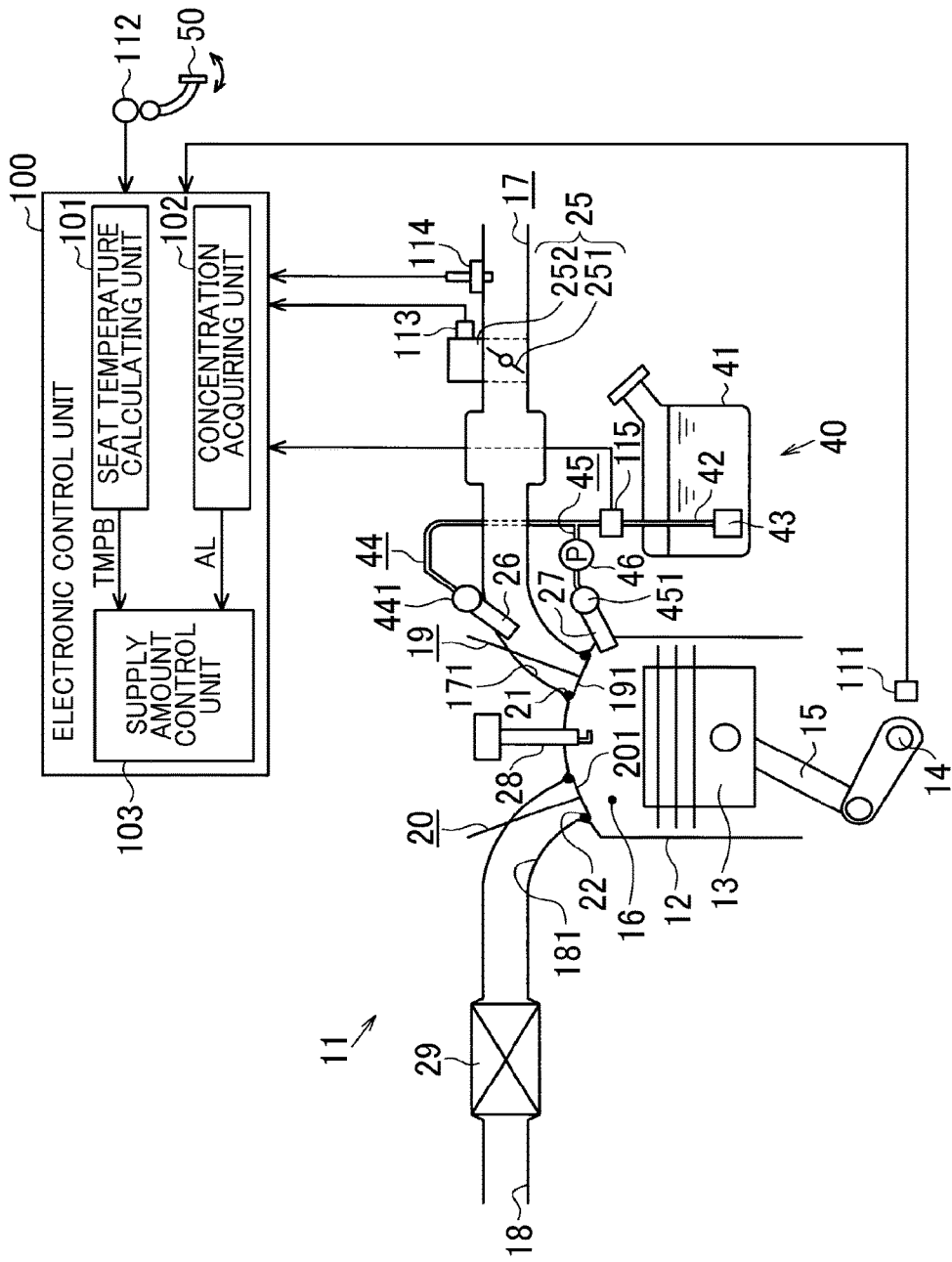
FIG. 1 is a diagram schematically illustrating the functional configuration of an electronic control unit that is an example of a fuel injection control device for an engine according to an example embodiment and the configuration of an engine controlled by the electronic control unit.

Hereinafter, a fuel injection control device for an engine according to an example embodiment will be described with reference to FIGS. 1 to 4. FIG. 1 illustrates an electronic control unit 100 that is the fuel injection control device for an engine according to the present embodiment, and an engine 11 controlled by the electronic control unit 100. The engine 11 is an engine in which gasoline, ethanol-mixed fuel containing gasoline and ethanol, or ethanol that does not contain gasoline can be used as fuel.

As illustrated in FIG. 1, a piston 13 that reciprocates in the up-down direction in FIG. 1 is disposed in a cylinder 12 of the engine 11. The piston 13 is connected to a crank shaft 14, which is an output shaft of the engine 11, via a connecting rod 15. With this configuration, the reciprocating motion of the piston 13 is converted into a rotational motion of the crank shaft 14.

A space above the piston 13 in the cylinder 12 serves as a combustion chamber 16. The engine 11 is provided with an intake passage 17 and an exhaust passage 18 that are connected to the combustion chamber 16. The engine 11 is also provided with an intake valve 19 and an exhaust valve 20. The intake valve 19 opens or closes an intake port 171 constituting the intake passage 17 to provide communication between the intake port 171 and the combustion chamber 16 or to interrupt communication between the intake port 171 and the combustion chamber 16. The exhaust valve 20 opens or closes an exhaust port 181 constituting the exhaust passage 18 to provide communication between the exhaust port 181 and the combustion chamber 16 or to interrupt communication between the exhaust port 181 and the combustion chamber 16.

A downstream end of the intake port 171 is provided with a ring-shaped intake valve seat 21 with which a disk portion 191 of the intake valve 19 comes into contact. An upstream end of the exhaust port 181 is provided with a ring-shaped exhaust valve seat 22 with which a disk portion 201 of the exhaust valve 20 comes into contact. The valve seats 21, 22 are each coated with an oxide film. With this configuration, the abrasion resistance of the valve seats 21, 22 is enhanced.

The engine 11 is provided with a throttle mechanism 25. The throttle mechanism 25 includes a throttle valve 251 disposed in the intake passage 17, and a throttle motor 252 that is a power source for the throttle valve 251. By driving the throttle motor 252 to control the opening degree of the throttle valve 251, the amount of intake air introduced into the combustion chamber 16 via the intake passage 17 is adjusted.

The engine 11 includes a port injection valve 26 that injects fuel into the intake port 171 constituting the intake passage 17, a cylinder injection valve 27 that directly injects fuel into the combustion chamber 16, and an ignition plug 28 that ignites an air-fuel mixture containing the intake air and the fuel injected from at least one of the injection valves 26, 27.

Exhaust gas produced by the combustion of the air-fuel mixture in the combustion chamber 16 is discharged to the exhaust passage 18 via the exhaust port 181. An exhaust gas control catalyst 29 that cleans up the exhaust gas flowing through the exhaust passage 18 is disposed in the exhaust passage 18.

A fuel supply system 40 of the engine 11 includes a fuel tank 41 that stores fuel, and a common passage 42 connected to the fuel tank 41. The common passage 42 is provided with a feed pump 43. A downstream end of the common passage 42 is connected to a first fuel passage 44 and a second fuel passage 45. A downstream end of the first fuel passage 44 serves as a first delivery pipe 441 to which the port injection valve 26 is connected. A downstream end of the second fuel passage 45 serves as a second delivery pipe 451 to which the cylinder injection valve 27 is connected. The second fuel passage 45 is provided with a high-pressure pump 46 that makes the fuel pressure in the second delivery pipe 451 higher than the fuel pressure in the first delivery pipe 441.

As illustrated in FIG. 1, various detection systems are electrically connected to the electronic control unit 100 for the engine 11. The various detection systems include a crank position sensor 111, an accelerator sensor 112, a throttle sensor 113, an airflow meter 114, and a concentration sensor 115. The crank position sensor 111 detects an engine speed Ne that is a rotational speed of the crank shaft 14. The accelerator sensor 112 detects an accelerator operation degree ACC that is a degree of operation of an accelerator pedal 50. The throttle sensor 113 detects a throttle opening degree TA that is an opening degree of the throttle valve 251. The airflow meter 114 detects an intake air amount GA. The concentration sensor 115 is disposed on the common passage 42 of the fuel supply system 40 and detects an ethanol concentration AL of the fuel in the common passage 42.

The electronic control unit 100 executes throttle control for adjusting the throttle opening degree TA and fuel injection control for controlling an amount of fuel injected from each of the injection valves 26, 27 based on the information detected by the various detection systems.

Next, the fuel injection control will be described. In the fuel injection control, a reference supply amount XB corresponding to the intake air amount GA is calculated. The reference supply amount XB is a fuel supply amount at which the air-fuel ratio of the air-fuel mixture to be combusted in the combustion chamber 16 is equal to a target air-fuel ratio. By executing various correction processes on the calculated reference supply amount XB, a required supply amount XR is calculated.

In the fuel injection control, an injection split ratio is calculated based on an engine speed Ne, an engine load factor, and an ethanol concentration AL. The engine load factor can be calculated based on the engine speed Ne and the intake air amount GA. The injection split ratio is a ratio of an amount of fuel injected from the port injection valve 26 to the required supply amount XR. The amount of fuel injected from the port injection valve 26 is calculated based on the required supply amount XR and the injection split ratio. A difference obtained by subtracting the amount of fuel injected from the port injection valve 26 from the required supply amount XR is calculated as an amount of fuel injected from the cylinder injection valve 27. Driving of the port injection valve 26 and driving of the cylinder injection valve 27 are controlled based on the calculation result.

Next, a part of the functional configuration of the electronic control unit 100 will be described with reference to FIG. 1. As illustrated in FIG. 1, the electronic control unit 100 includes a seat temperature calculating unit 101, a concentration acquiring unit 102, and a supply amount control unit 103, as functional units that are constituted by at least one of software and hardware.

The seat temperature calculating unit 101 calculates a simulated temperature TMPB of the exhaust valve seat 22 based on the relationship between the engine speed Ne and the engine load factor. The seat temperature calculating unit 101 outputs the information about the calculated simulated temperature TMPB to the supply amount control unit 103. The simulated temperature TMPB of the exhaust valve seat 22 is a temperature convergence value that the actual temperature of the exhaust valve seat 22 may reach when an operation in which the engine speed Ne and the engine load factor used for the calculation are maintained is continued in the engine 11.

Figure 2:
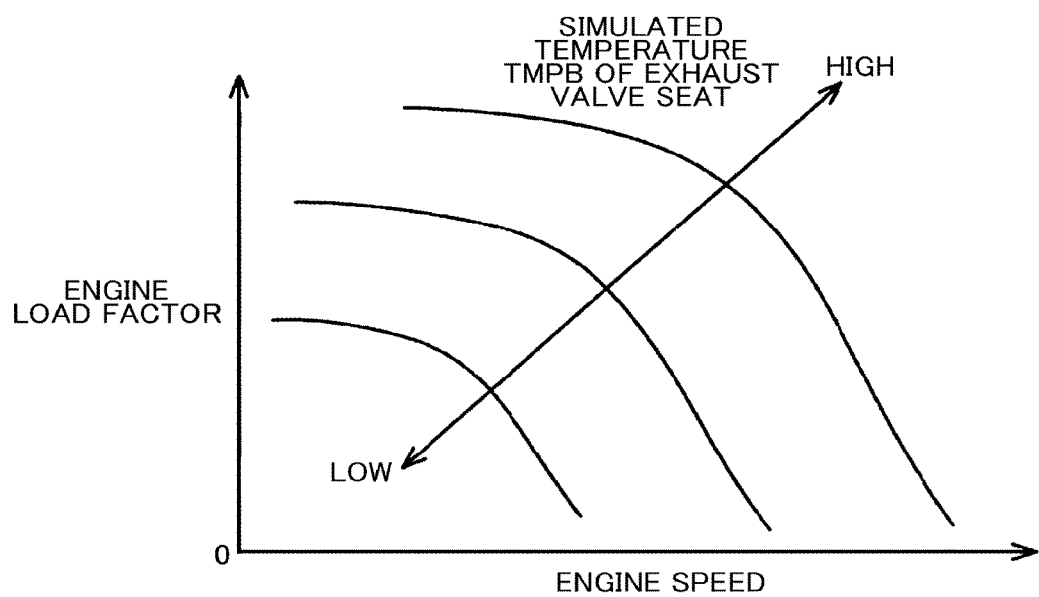
FIG. 2 is a map used in the electronic control unit, the map being used to calculate a simulated temperature of an exhaust valve seat from the relationship between the engine speed and the engine load factor.

The simulated temperature TMPB of the exhaust valve seat 22 can be calculated based on a map illustrated in FIG. 2. The map is used to calculate the simulated temperature TMPB of the exhaust valve seat 22 based on the relationship between the engine speed Ne and the engine load factor. That is, as illustrated in FIG. 2, the simulated temperature TMPB, which is calculated based on the map, becomes higher as the engine speed Ne becomes higher, and becomes higher as the engine load factor becomes larger.

Referring to FIG. 1 again, the concentration acquiring unit 102 acquires an ethanol concentration AL of the fuel in the common passage 42 of the fuel supply system 40 based on the information output from the concentration sensor 115. The concentration acquiring unit 102 outputs the information about the acquired ethanol concentration AL of the fuel to the supply amount control unit 103.

The supply amount control unit 103 determines whether it is necessary to execute fuel increase control (described later) based on the simulated temperature TMPB of the exhaust valve seat 22 calculated by the seat temperature calculating unit 101.

When the supply amount control unit 103 determines that it is necessary to execute the fuel increase control, the supply amount control unit 103 executes the fuel increase control and then calculates a required supply amount XR. On the other hand, when the supply amount control unit 103 determines that it is not necessary to execute the fuel increase control, the supply amount control unit 103 calculates a required supply amount XR without executing the fuel increase control.

When the required supply amount XR is calculated by the supply amount control unit 103 in this way, the electronic control unit 100 controls driving of at least one of the port injection valve 26 and the cylinder injection valve 27 based on the required supply amount XR and the injection split ratio.

Next, a process routine executed by the supply amount control unit 103 will be described with reference to a flowchart illustrated in FIG. 3 and a graph illustrated in FIG. 4. This process routine is a process routine for calculating the required supply amount XR, and is executed at every control cycle set in advance.

Figure 3:
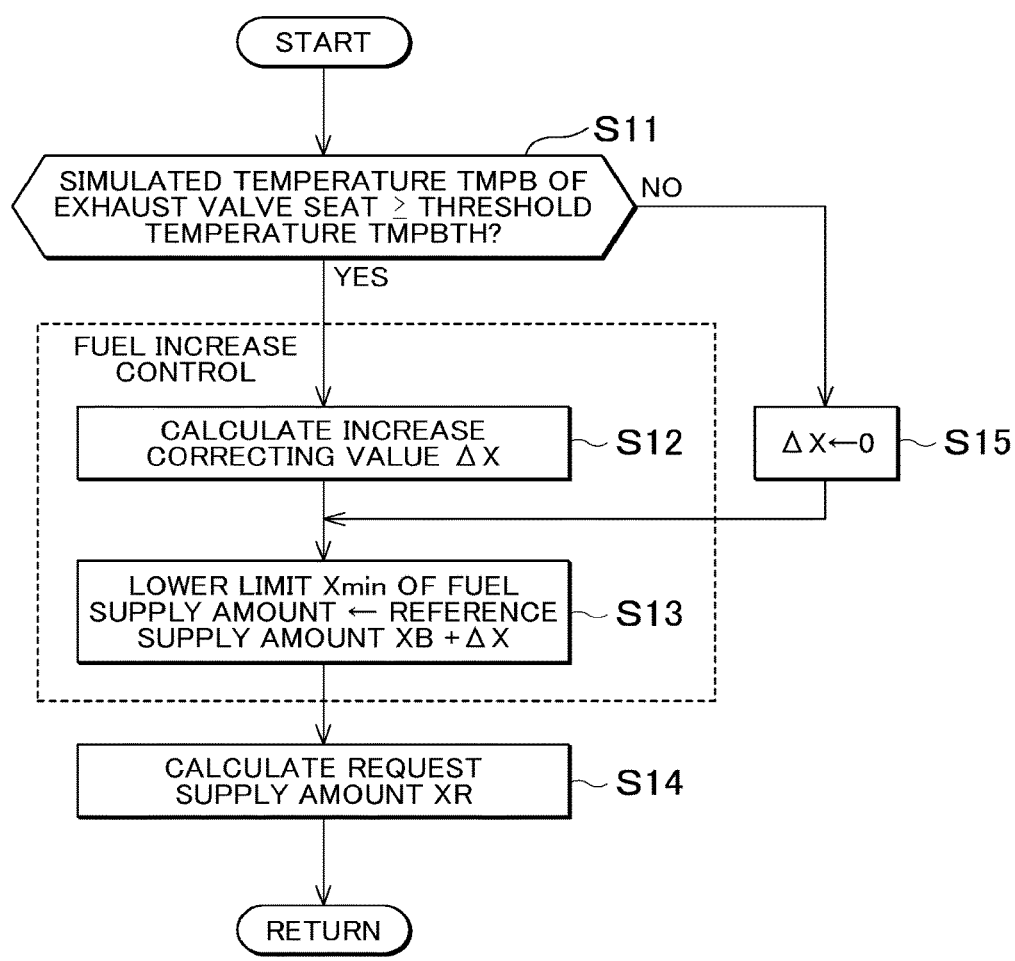
FIG. 3 is a flowchart illustrating a process routine executed by a supply amount control unit of the electronic control unit.
Figure 4:
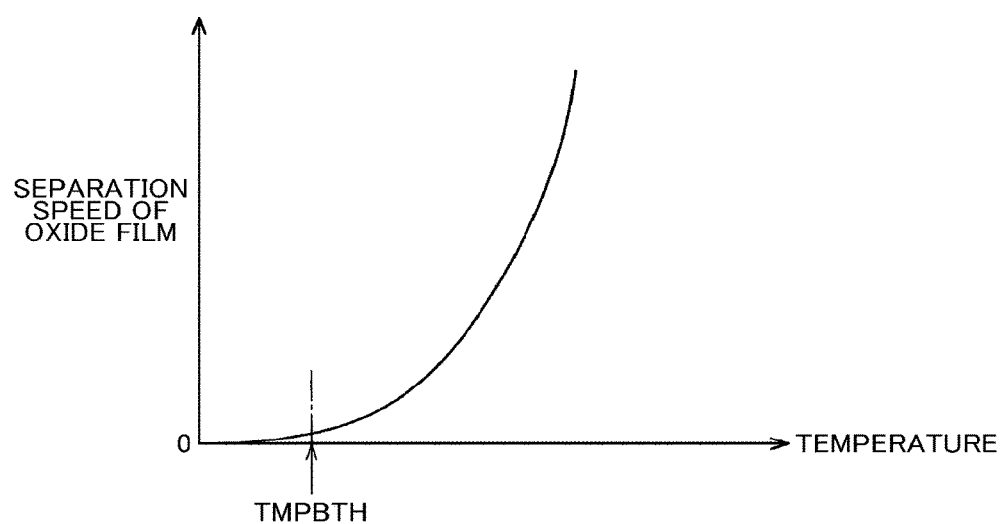
FIG. 4 is a graph illustrating the relationship between the temperature of the exhaust valve seat and the speed of separation of an oxide film from the exhaust valve seat.

As illustrated in FIG. 3, the supply amount control unit 103 determines whether the simulated temperature TMPB of the exhaust valve seat 22 calculated by the seat temperature calculating unit 101 is equal to or higher than a threshold temperature TMPBTH set in advance (Step S11).

A method of setting the threshold temperature TMPBTH will be described below with reference to FIG. 4. The graph illustrated in FIG. 4 represents the relationship between the temperature of the exhaust valve seat 22 and the speed of separation of the oxide film from the exhaust valve seat 22. As illustrated in FIG. 4, when the temperature of the exhaust valve seat 22 is relatively low, the separation speed of the oxide film is considerably low. However, when the temperature of the exhaust valve seat 22 increases to some extent, the ratio of a variation in the separation speed of the oxide film with respect to a certain amount of increase in the temperature of the exhaust valve seat 22 abruptly increases. Thus, in the present embodiment, the threshold temperature TMPBTH is set to a temperature of the exhaust valve seat 22 immediately before the ratio abruptly increases.

Therefore, when the simulated temperature TMPB of the exhaust valve seat 22 is lower than the threshold temperature TMPBTH, the oxide film can be determined to be less likely to be separated from the exhaust valve seat 22. On the other hand, when the simulated temperature TMPB is equal to or higher than the threshold temperature TMPBTH, the oxide film can be determined to be easily separated from the exhaust valve seat 22.

Referring to FIG. 3 again, when the simulated temperature TMPB of the exhaust valve seat 22 is equal to or higher than the threshold temperature TMPBTH (YES in Step S11), the supply amount control unit 103 calculates an increase correcting value ΔX based on the ethanol concentration AL of the fuel to be injected, the engine speed Ne, and the engine load factor (Step S12). At this time, the supply amount control unit 103 sets the increase correcting value ΔX to a larger value as the ethanol concentration AL of the fuel is higher. The supply amount control unit 103 sets the increase correcting value ΔX to a larger value as the engine speed Ne is higher, and sets the increase correcting value ΔX to a larger value as the engine load factor is larger.

Then, the supply amount control unit 103 adds the increase correcting value ΔX to the reference supply amount XB, and sets the sum of the increase correcting value ΔX and the reference supply amount XB as a lower limit Xmin of the fuel supply amount (Step S13). Subsequently, the supply amount control unit 103 calculates the required supply amount XR such that the required supply amount XR does not fall below the lower limit Xmin of the fuel supply amount (Step S14). Then, the supply amount control unit 103 ends the process routine.

Note that, the increasing correction for making the amount of fuel to be supplied into the combustion chamber 16 larger than the reference supply amount XB may be executed for purposes other than lowering of the actual temperature of the exhaust valve seat 22. Examples of other increasing corrections include increasing correction for warming up the engine 11 promptly. When the simulated temperature TMPB of the exhaust valve seat 22 becomes equal to or higher than the threshold temperature TMPBTH while another increasing correction is executed, the required supply amount XR may be larger than the lower limit Xmin of the fuel supply amount calculated in Step S13. On the other hand, when the simulated temperature TMPB of the exhaust valve seat 22 becomes equal to or larger than the threshold temperature TMPBTH while no other increasing correction is executed, the required supply amount XR becomes equal to the lower limit Xmin of the fuel supply amount.

On the other hand, when the simulated temperature TMPB of the exhaust valve seat 22 is lower than the threshold temperature TMPBTH (NO in Step S11), the supply amount control unit 103 substitutes "0 (zero)" for the increase correcting value ΔX (Step S15), and proceeds to Step S13. In this case, since the increase correcting value ΔX is "0 (zero)", the lower limit Xmin of the fuel supply amount is set to be equal to the reference supply amount XB in Step S13, and the required supply amount XR is calculated such that the required supply amount XR does not fall below the lower limit Xmin (=XB) of the fuel supply amount in Step S14. For example, when Step S15 is executed instead of Step S12 while another increasing correction is executed, the required supply amount XR becomes larger than the lower limit Xmin (=XB) of the fuel supply amount. On the other hand, while no other increasing correction is executed, the required supply amount XR becomes equal to the lower limit Xmin (=XB) of the fuel supply amount.

That is, when the engine operation state is changed from a state where the simulated temperature TMPB of the exhaust valve seat 22 is lower than the threshold temperature TMPBTH to a state where the simulated temperature TMPB of the exhaust valve seat 22 is equal to or higher than the threshold temperature TMPBTH (YES in Step S11), the lower limit Xmin of the fuel supply amount is increased (raised) to be larger than that before the simulated temperature TMPB becomes equal to or higher than the threshold temperature TMPBTH (Steps S12, S13). Thus, in the present embodiment, execution of the "fuel increase control" can be implemented by executing the process of Step S12 and the process of Step S13. When the fuel increase control is started, the lower limit Xmin of the fuel supply amount is increased to be larger, by the increase correcting value ΔX, than that before the fuel increase control is executed. Therefore, the increase correcting value ΔX is an example of "an amount by which the lower limit of the fuel supply amount is increased when the simulated temperature TMPB of the exhaust valve seat 22 becomes equal to or higher than the threshold temperature TMPBTH".

When the engine operation state is changed while the fuel increase control is executed and the simulated temperature TMPB of the exhaust valve seat 22 becomes lower than the threshold temperature TMPBTH (NO in Step S11), the increase correcting value ΔX is set to "0 (zero)" (Step S15) and the lower limit Xmin of the fuel supply amount is made equal to the reference supply amount XB (Step S13). That is, execution of the fuel increase control is ended by executing Step S15 instead of Step S12.

Next, the operation of the present embodiment will be described with reference to FIG. 4. When the simulated temperature TMPB of the exhaust valve seat 22 calculated based on the relationship between the engine speed Ne and the engine load factor is lower than the threshold temperature TMPBTH (NO in Step S11), the fuel increase control is not executed. In this case, since the increase correcting value ΔX is set to "0 (zero)" (Step S15), the lower limit Xmin of the fuel supply amount becomes equal to the reference supply amount XB (Step S13). In this state, when no increasing correction other than the increasing correction for the purpose of lowering the temperature of the exhaust valve seat 22 is executed, the amount of fuel actually supplied into the combustion chamber 16 becomes equal to the lower limit Xmin of the fuel supply amount (i.e., the reference supply amount XB).

When at least one of the engine speed Ne and the engine load factor increases and the simulated temperature TMPB of the exhaust valve seat 22 becomes equal to or higher than the threshold temperature TMPBTH (YES in Step S11), the fuel increase control is started (Steps S12, S13). That is, the increase correcting value ΔX is set based on the ethanol concentration AL of the fuel, the engine speed Ne, and the engine load factor, and the sum of the increase correcting value ΔX and the reference supply amount XB is set as the lower limit Xmin of the fuel supply amount. The required supply amount XR is calculated based on the lower limit Xmin of the fuel supply amount.

At this time, when no other increasing correction is executed, the required supply amount XR becomes larger than that before the fuel increase control is started due to an increase in the lower limit Xmin of the fuel supply amount caused by executing the fuel increase control. That is, it is possible to reliably achieve the state where the amount of fuel actually supplied into the combustion chamber 16 is large, by executing the fuel increase control.

For example, when the injection split ratio is not changed, the fuel increase control is executed while fuel is injected from the port injection valve 26 and the amount of fuel to be injected from the port injection valve 26 is increased in some cases. In this case, most of the fuel injected from the port injection valve 26 is vaporized in the intake port 171 and thus the temperature of the air-fuel mixture introduced into the combustion chamber 16 from the intake port 171 is lowered. That is, the air-fuel mixture having a relatively low temperature is introduced into the combustion chamber 16. Thus, the temperature in the combustion chamber 16 in the intake stroke becomes lower than that when the fuel increase control is not executed, that is, when the lower limit Xmin of the fuel supply amount is not increased to be larger than the reference supply amount XB.

For example, when the injection split ratio is not changed, the fuel increase control is executed while fuel is injected from the cylinder injection valve 27 and the amount of fuel to be injected from the cylinder injection valve 27 is increased in some cases. In this case, the fuel injected from the cylinder injection valve 27 is vaporized in the combustion chamber 16 and thus the temperature of the air-fuel mixture containing the fuel and intake air is lowered in the combustion chamber 16. Thus, the temperature in the combustion chamber 16 in the intake stroke becomes lower than that when the fuel increase control is not executed, that is, when the lower limit Xmin of the fuel supply amount is not increased to be larger than the reference supply amount XB.

By reliably achieving the state where the temperature in the combustion chamber 16 in the intake stroke is low in this way, it is possible to more reliably achieve the state where the actual temperature of the exhaust valve seat 22 in the intake stroke is low, than when the fuel increase control is not executed. That is, as illustrated in FIG. 4, the speed of separation of the oxide film from the exhaust valve seat 22 is prevented from increasing, by reliably achieving the state where the actual temperature of the exhaust valve seat 22 is low, that is, by making the actual temperature of the exhaust valve seat 22 less likely to become high. Therefore, even when the amount of fuel actually supplied into the combustion chamber 16 increases through the execution of the fuel increase control and thus the amount of acetaldehyde produced in the combustion chamber 16 increases, the oxide film is prevented from being easily separated from the exhaust valve seat 22 because the state where the actual temperature of the exhaust valve seat 22 is low is reliably achieved.

On the other hand, when increasing correction for a purpose other than lowering of the actual temperature of the exhaust valve seat 22 is executed, the required supply amount XR is larger than the lower limit Xmin of the fuel supply amount from a stage where the simulated temperature TMPB of the exhaust valve seat 22 is lower than the threshold temperature TMPBTH. When the simulated temperature TMPB becomes equal to or higher than the threshold temperature TMPBTH while another increasing correction is executed in this way, the lower limit Xmin of the fuel supply amount becomes larger than that before the simulated temperature TMPB is made equal to or higher than the threshold temperature TMPBTH through the execution of the fuel increase control.

However, while another increasing correction is executed, the amount of fuel (=XR) actually supplied into the combustion chamber 16 before the fuel increase control is started may be already larger than the lower limit Xmin of the fuel supply amount, which has been increased by executing the fuel increase control. In the present embodiment, when the amount of fuel actually supplied into the combustion chamber 16 is sufficiently large even before the fuel increase control is started as described above, the amount of fuel actually supplied into the combustion chamber 16 is not increased in spite of start of the fuel increase control. In this case, since the state where the actual temperature of the exhaust valve seat 22 is low is reliably achieved before the fuel increase control is started, the oxide film is prevented from being separated from the exhaust valve seat 22 even when the amount of fuel actually supplied into the combustion chamber 16 is not increased.

According to the above-described configuration and operation, the following advantageous effects can be obtained. (1) When the temperature of the exhaust valve seat 22 is predicted to become high, the lower limit Xmin of the fuel supply amount is increased through the execution of the fuel increase control. It is thus possible to reliably achieve the state where the amount of fuel actually supplied into the combustion chamber 16 is large. As a result, the state where the actual temperature of the exhaust valve seat 22 is low can be reliably achieved, and thus the oxide film is prevented from being easily separated from the exhaust valve seat 22. By reducing the separation of the oxide film from the exhaust valve seat 22 in this way, it is possible to avoid reduction in the abrasion resistance of the exhaust valve seat 22.

(2) As described above, the intake valve seat 21 is also coated with an oxide film, and the oxide film is likely to be separated from the intake valve seat 21 when the temperature of the intake valve seat 21 becomes high. In view of this, in the present embodiment, by reliably achieving the state where the amount of fuel actually supplied into the combustion chamber 16 is large through execution of the fuel increase control, it is possible to reliably achieve the state where the actual temperature of the intake valve seat 21 is low. Thus, it is also possible to prevent the oxide film from being separated from the intake valve seat 21, thereby avoiding reduction in the abrasion resistance of the intake valve seat 21.

(3) In the present embodiment, as the ethanol concentration of the fuel is higher and as the amount of acetaldehyde produced in the combustion chamber 16 is larger, the lower limit Xmin of the fuel supply amount is increased by a larger amount through the execution of the fuel increase control. Thus, even when the amount of acetaldehyde produced in the combustion chamber 16 is large, it is possible to reliably achieve the state where the actual temperature of the exhaust valve seat 22 is low, thereby preventing the oxide film from being easily separated from the exhaust valve seat 22.

(4) When at least one of the engine speed Ne and the engine load factor decreases even when the fuel increase control is executed, the simulated temperature TMPB of the exhaust valve seat 22 decreases. When the simulated temperature TMPB becomes lower than the threshold temperature TMPBTH, execution of the fuel increase control ends and the lower limit Xmin of the fuel supply amount is decreased. As a result, the increase in the amount of fuel to be supplied into the combustion chamber 16 for the purpose of preventing separation of the oxide film ends. Therefore, the amount of fuel to be supplied into the combustion chamber 16 is prevented from being unnecessarily increased, and accordingly it is possible to reduce deterioration of exhaust emission.

(5) In the present embodiment, when the operation in which the actual temperature of the exhaust valve seat 22 is made higher is carried out in the engine 11, the lower limit Xmin of the fuel supply amount is increased by a larger amount through the execution of the fuel increase control. Thus, in the intake stroke, since the state where the actual temperature of the exhaust valve seat 22 is low can be reliably achieved, it is possible to enhance the advantageous effect of preventing the oxide film from being easily separated from the exhaust valve seat 22.

The foregoing embodiment may be modified into the following embodiments. The engine provided with the fuel injection control device for an engine may be supplied with fuel that does not contain ethanol (that is, fuel containing only gasoline) instead of the ethanol-mixed fuel. When the engine performs an operation in which the fuel that does not contain ethanol is used, it can be determined that acetaldehyde is not produced in the combustion chamber 16. Therefore, the increase correcting value ΔX may be set to "0 (zero)" regardless of whether the simulated temperature TMPB of the exhaust valve seat 22 is equal to or higher than the threshold temperature TMPBTH.

When the increase correcting value ΔX is varied depending on the ethanol concentration AL of the fuel, the increase correcting value ΔX need not be varied depending on the engine speed Ne. In this case as well, it is also possible to obtain the advantageous effects equivalent to the foregoing advantageous effects (1) to (4).

When the increase correcting value ΔX is varied depending on the ethanol concentration AL of the fuel, the increase correcting value ΔX need not be varied depending on the engine load factor. In this case as well, it is also possible to obtain the advantageous effects equivalent to the foregoing advantageous effects (1) to (4).

The seat temperature calculating unit 101 may calculate the simulated temperature of the exhaust valve seat 22 by a method other than the method described in the foregoing embodiment. For example, the simulated temperature may be calculated based on the temperature of a coolant for cooling the engine 11 in addition to the engine speed Ne and the engine load factor. In this case, it is possible to calculate the simulated temperature closer to the actual temperature of the exhaust valve seat 22 than that calculated by the method described in the foregoing embodiment.

When the simulated temperature is calculated by such a method that the simulated temperature is varied sensitively in response to the variation in the operation state of the engine 11, a haunting phenomenon in which start and end of the fuel increase control are repeated for a short time may occur. Therefore, an ending threshold temperature that is lower than the threshold temperature TMPBTH may be additionally provided as a threshold value for ending the fuel increase control, in addition to the threshold temperature TMPBTH that is a threshold value for starting the fuel increase control. In this case, the supply amount control unit 103 starts the fuel increase control when the simulated temperature calculated while the fuel increase control is not executed becomes equal to or higher than the threshold temperature TMPBTH, and ends execution of the fuel increase control when the simulated temperature calculated while the fuel increase control is executed becomes lower than the ending threshold temperature. In this case, by setting the threshold temperature TMPBTH and the ending threshold temperature to appropriate values, it is possible to reduce the occurrence of the haunting phenomenon in which start and end of the fuel increase control are repeated for a short time.

The fuel increase control may be ended at a timing at which a prescribed time has elapsed from the time point at which the simulated temperature of the exhaust valve seat 22 becomes equal to or higher than the threshold temperature. The prescribed time may be fixed to a value set in advance, or may vary depending on the ethanol concentration of the fuel, the engine speed Ne, and the engine load factor.

As described above, the amount of fuel actually supplied into the combustion chamber 16 is determined by making a variety of corrections on the reference supply amount XB. That is, the fuel supply amount may be corrected for a purpose other than lowering of the temperature of the exhaust valve seat 22.

Therefore, the supply amount control unit 103 may set the sum of the reference supply amount XB and a correction value ΔY for another purpose, as the lower limit Xmin of the fuel supply amount, when the simulated temperature of the exhaust valve seat 22 is lower than the threshold temperature, that is, when the fuel increase control is not executed. When the simulated temperature becomes equal to or higher than the threshold temperature, the increase correcting value ΔX may be added to the sum of the reference supply amount XB and the correction value ΔY for the other purpose and the sum (=XB+ΔY+ΔX) may be set as the lower limit Xmin of the fuel supply amount. In this case as well, it is also possible to make the lower limit Xmin (=XB+ΔY+ΔX) of the fuel supply amount during execution of the fuel increase control larger than the lower limit (=XB+ΔY) of the fuel supply amount before the fuel increase control is started.

With this configuration, when the simulated temperature of the exhaust valve seat 22 becomes equal to or higher than the threshold temperature and the fuel increase control is started, the amount of fuel actually supplied into the combustion chamber 16 is increased to be larger than that before the simulated temperature of the exhaust valve seat 22 becomes equal to or higher than the threshold temperature. On the other hand, when an ending condition for ending the fuel increase control is satisfied while the fuel increase control is executed and then execution of the fuel increase control ends, the amount of fuel actually supplied into the combustion chamber 16 is decreased.

When the ethanol concentration of the fuel stored in the fuel supply system 40 varies due to, for example, refueling, the air-fuel ratio varies. That is, by monitoring the variation in the air-fuel ratio, it is possible to estimate the ethanol concentration of the fuel to be supplied into the combustion chamber 16. Therefore, the concentration acquiring unit 102 may be configured to acquire the ethanol concentration of the fuel by estimating the ethanol concentration of the fuel based on the variation in the air-fuel ratio.

The engine provided with the fuel injection control device for an engine may be an engine provided with only the port injection valve 26 or may be an engine provided with only the cylinder injection valve 27, as long as the engine can operate on fuel containing ethanol.

What is claimed is:

1. A fuel injection control device for an engine, the engine configured to operate on fuel containing ethanol, and the engine provided with an exhaust valve seat coated with an oxide film, the fuel injection control device comprising
an electronic control unit configured to
(i) calculate a simulated temperature of the exhaust valve seat such that
(a) the simulated temperature of the exhaust valve seat is higher as an engine speed is higher, and
(b) the simulated temperature of the exhaust valve seat is higher as an engine load factor is larger,
(ii) start fuel increase control when the simulated temperature of the exhaust valve seat becomes equal to or higher than a threshold temperature, the fuel increase control being a control of increasing a lower limit value of a fuel supply amount to a larger value than the lower limit value of the fuel supply amount when the simulated temperature of the exhaust valve seat is lower than the threshold temperature, and the fuel supply amount being an amount of fuel to be supplied into a cylinder,
(iii) acquire an ethanol concentration of the fuel, and
(iv) control the fuel supply amount such that an amount of increase in the lower limit value of the fuel supply amount is larger as the ethanol concentration of the fuel is higher, in the fuel increase control.

2. The fuel injection control device according to claim 1, wherein the electronic control unit is configured to end execution of the fuel increase control when the simulated temperature of the exhaust valve seat becomes lower than the threshold temperature while the fuel increase control is executed.

3. The fuel injection control device according to claim 1, wherein the electronic control unit is configured to control the fuel supply amount such that the amount of increase in the lower limit value of the fuel supply amount is larger as the engine speed is higher, in the fuel increase control.

4. The fuel injection control device according to claim 1, wherein the electronic control unit is configured to control the fuel supply amount such that the amount of increase in the lower limit value of the fuel supply amount is larger as the engine load factor is larger, in the fuel increase control.

* * * * *